(12) United States Patent
Son et al.

(10) Patent No.: US 11,271,271 B2
(45) Date of Patent: Mar. 8, 2022

(54) BUS BAR AND BATTERY PACK INCLUDING THE SAME

(71) Applicant: SK Innovation Co., Ltd., Seoul (KR)

(72) Inventors: Sol San Son, Daejeon (KR); Dong Ha Hwang, Daejeon (KR); Seok Min Kim, Daejeon (KR); Seo Roh Rhee, Daejeon (KR); Ji Seok Lee, Daejeon (KR); Gyu Jin Chung, Daejeon (KR); Seung Hoon Ju, Daejeon (KR); Yang Kyu Choi, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 141 days.

(21) Appl. No.: 16/532,891

(22) Filed: Aug. 6, 2019

(65) Prior Publication Data

US 2020/0083512 A1    Mar. 12, 2020

(30) Foreign Application Priority Data

Sep. 11, 2018  (KR) ................. 10-2018-0108445

(51) Int. Cl.

| | |
|---|---|
| *H01M 2/20* | (2006.01) |
| *H01M 2/10* | (2006.01) |
| *H01M 2/30* | (2006.01) |
| *H02J 7/00* | (2006.01) |
| *H01M 10/0585* | (2010.01) |
| *H01M 50/502* | (2021.01) |
| *H01M 50/20* | (2021.01) |
| *H01M 50/543* | (2021.01) |

(52) U.S. Cl.
CPC ..... *H01M 50/502* (2021.01); *H01M 10/0585* (2013.01); *H01M 50/20* (2021.01); *H01M 50/543* (2021.01); *H02J 7/0029* (2013.01); *H02J 7/00304* (2020.01)

(58) Field of Classification Search
CPC ....................................................... H01R 11/00
See application file for complete search history.

(56) References Cited

U.S. PATENT DOCUMENTS

| | | | | |
|---|---|---|---|---|
| 8,574,008 | B2 * | 11/2013 | Gro ..................... | H01M 50/571 439/627 |
| 2004/0166727 | A1 * | 8/2004 | Ling .................... | H01R 11/288 439/507 |
| 2007/0099073 | A1 * | 5/2007 | White ................. | H01M 50/213 429/158 |
| 2011/0303459 | A1 * | 12/2011 | Chuang ............... | H01M 50/502 174/75 R |
| 2014/0315051 | A1 * | 10/2014 | Han .................... | H01M 50/581 429/61 |
| 2015/0171413 | A1 * | 6/2015 | Schweinbenz ...... | H01M 50/531 429/61 |
| 2015/0243957 | A1 * | 8/2015 | Han .................... | H01M 50/502 429/61 |
| 2016/0126048 | A1 * | 5/2016 | Kawase ................ | H01H 1/58 337/295 |
| 2018/0130992 | A1 * | 5/2018 | Xu ....................... | H01M 50/502 |
| 2018/0219203 | A1 * | 8/2018 | Jones ................. | H01M 10/6551 |

* cited by examiner

*Primary Examiner* — Amanda J Barrow
(74) *Attorney, Agent, or Firm* — IP & T Group LLP

(57) ABSTRACT

A bus bar includes terminal portions disposed at both ends, respectively; a plurality of bridges disposed between the terminal portions to electrically connect the terminal portions, and to be sequentially fused when an overcurrent flows. The plurality of bridges may be configured to have different resistance values, respectively.

10 Claims, 6 Drawing Sheets

BUS BAR AND BATTERY PACK INCLUDING THE SAME

CROSS-REFERENCE TO RELATED APPLICATIONS(S)

This application claims benefit of priority to Korean Patent Application No. 10-2018-0108445 filed on Sep. 11, 2018 in the Korean Intellectual Property Office, the disclosure of which is incorporated herein by reference in its entirety.

BACKGROUND

1. Field

The present disclosure relates to a bus bar and a battery pack including the same.

2. Description of Related Art

Recently, a high output battery pack using a nonaqueous electrolyte having a high energy density has been developed. Such a high output battery pack is implemented with a high capacity by connecting a plurality of battery modules in series or in parallel so as to be used for driving a motor, such as a vehicle or the like, a device requiring high power.

Meanwhile, a bus bar is used as a member for connecting a plurality of battery modules. In the case of a bus bar in the related art, it is commonly bonded in order to prevent the bus bar from being separated from terminal portions, and a bus bar is generally bound through nut and bolt fastening or through welding fastening.

In such a battery pack, when a battery module is overheated, there is a danger of explosion, and thus, securing safety is an important consideration.

Overheating of the battery module may occur due to various causes, but one of the causes is when an overcurrent beyond a certain limit flows through the battery module. When the overcurrent flows, the battery module is heated, such that an internal temperature of the battery module rapidly rises.

In addition, rapid temperature rise causes an electrolyte decomposition reaction, causing thermal running, eventually leading to a battery explosion.

Therefore, the battery module may be used in combination with a protection circuit to protect the battery pack from an abnormal situation such as the occurrence of an overcurrent.

SUMMARY

An aspect of the present disclosure is to provide a bus bar capable of improving stability from a safety problem occurring when an overcurrent occurs and a battery pack including the bus bar.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

According to an aspect of the present disclosure, a bus bar includes terminal portions disposed at both ends thereof, respectively, a plurality of bridges disposed between the terminal portions to electrically connect the terminal portions and to be sequentially fused when an overcurrent flows. The plurality bridges may be configured to have different resistance values.

In the present embodiment, the plurality of bridges may be formed to have different cross-sectional areas, respectively.

In the present embodiment, the plurality of bridges may be formed such that any one of a width, a length, or a thickness thereof is different.

In the present embodiment, the plurality of bridges may be formed of different materials.

In the present embodiment, a penetrating portion having a through-hole shape may be disposed between the bridges.

In the present embodiment, at least one of the bridges may include a narrow section having a narrower width.

In the present embodiment, at least one of the bridges may be configured such that at least a portion thereof is disposed to be protruded to one side.

In the present embodiment, the bridges may be configured such that all the remaining bridges are fused within 30 milliseconds (ms), after the first bridge is fused when an overcurrent flows.

In the present embodiment, the bridges may be composed of four bridges. When a resistance value of the first bridge is 1, it may be configured that a resistance value of the second bridge is 2, a resistance value of the third bridge is 3, and a resistance value of the fourth bridge is 3.5.

In the present embodiment, the resistance values of the remaining bridges may be set to be gradually larger than the resistance value of the first bridge.

In addition, a battery pack according to the present embodiment may include the at least one bus bar and a plurality of battery modules electrically connected by the bus bar.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
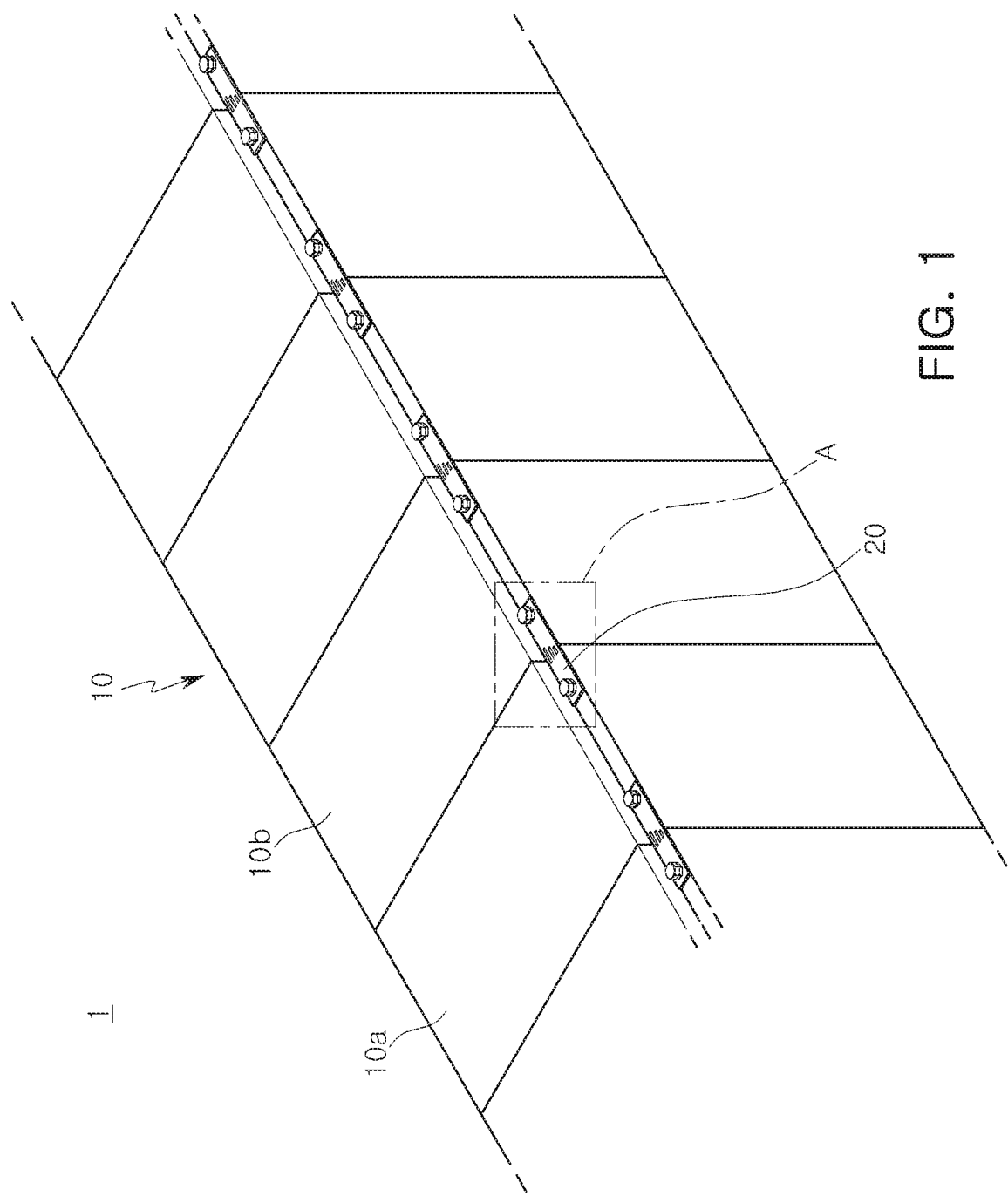
FIG. 1 is a schematic perspective view illustrating a battery pack according to an embodiment of the present disclosure.

Hereinafter, exemplary embodiments of the present disclosure will be described in detail with reference to the accompanying drawings. The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals. Through the specification, terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures.

FIG. 1 is a schematic perspective view illustrating a battery pack according to an embodiment of the present disclosure.

Referring to FIG. 1, a battery pack 1 according to an embodiment of the present disclosure may include a plurality of battery modules 10 and a bus bar 20.

Each of battery modules 10a and 10b has a substantially hexahedral shape, and may be arranged in a structure continuous in one direction. Each of the battery modules 10a and 10b may include a secondary battery such as a lithium secondary battery, a nickel-hydrogen battery, or the like, capable of being charged and discharged.

The plurality of battery modules 10a and 10b may be connected in series or in parallel. In addition, each of the battery modules 10a and 10b may be provided with a pair of external terminals (not shown).

The external terminals may be electrically connected to each other via the bus bar 20.

Figure 2:
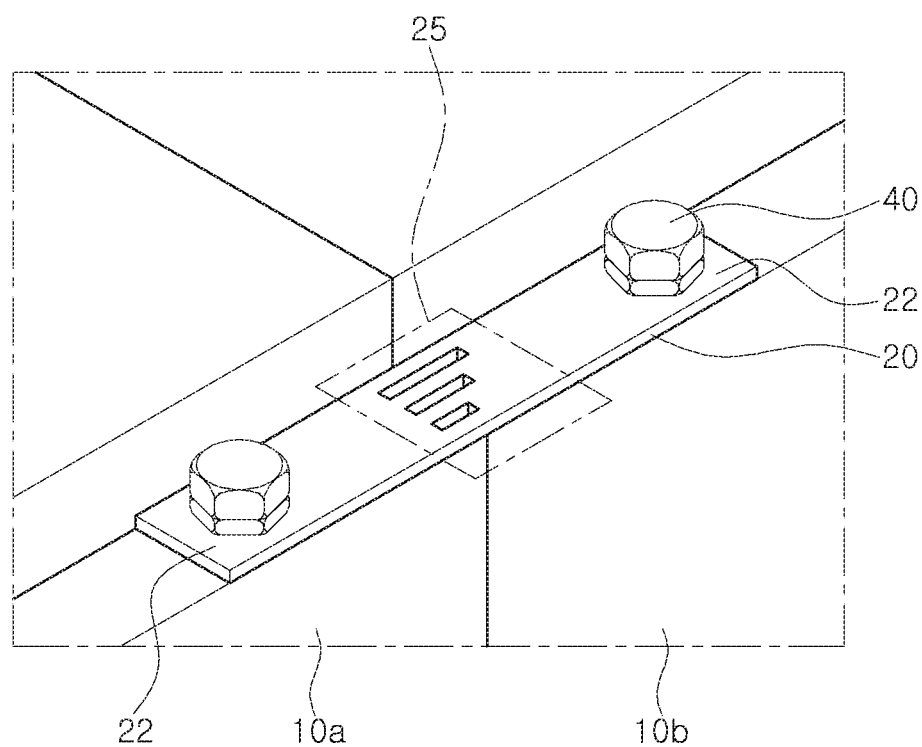
FIG. 2 is an enlarged perspective view of portion A of FIG. 1.
Figure 3:
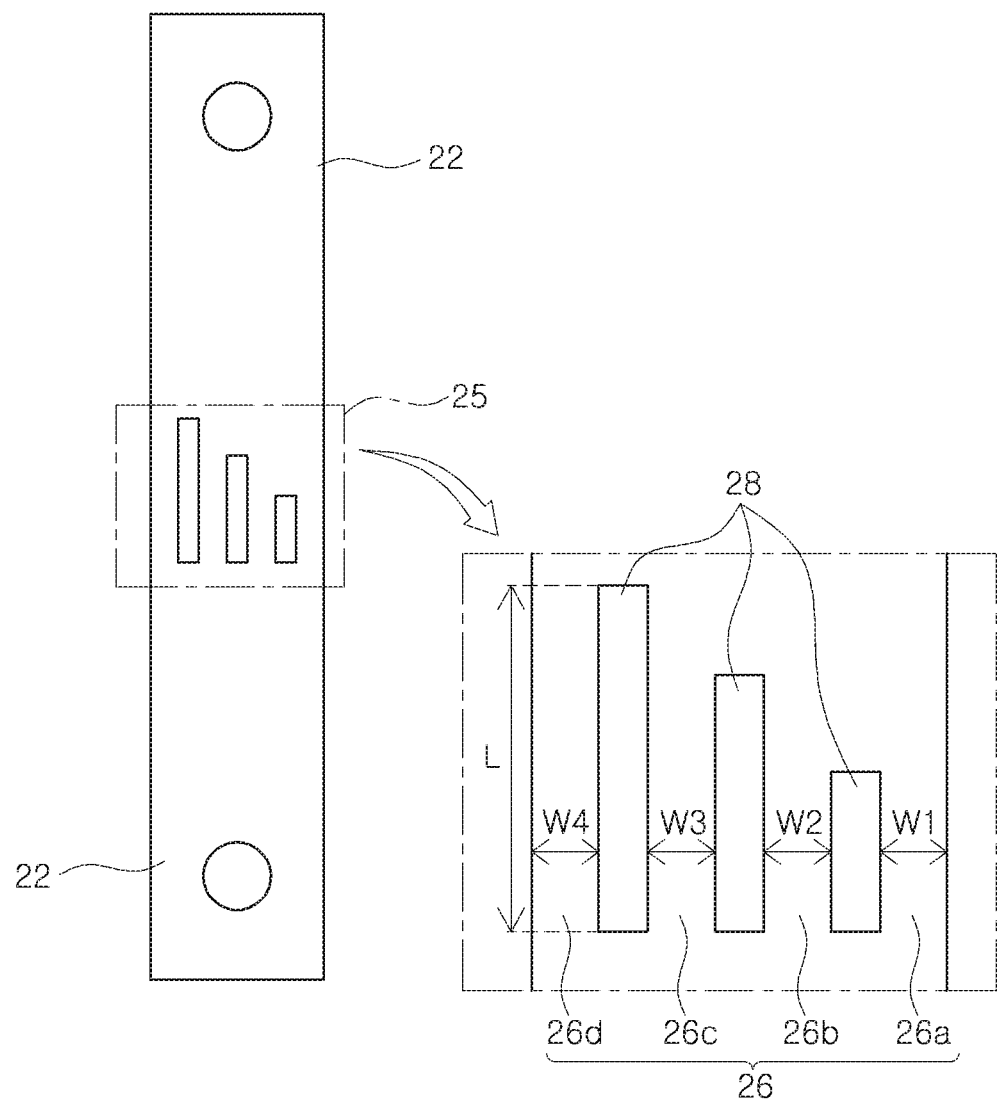
FIG. 3 is a schematic plan view illustrating the bus bar of FIG. 2.

FIG. 2 is an enlarged perspective view of portion A of FIG. 1, and FIG. 3 is a plan view of the bus bar of FIG. 2.

Referring to FIGS. 2 and 3, each of the battery modules 10a and 10b may be electrically connected to each other via the bus bar 20. The bus bar 20 may be fastened to the battery modules 10a and 10b through a fixing member 40 such as a bolt or a screw, but is not limited thereto. For example, various modifications may be made such as directly bonding to the external terminal by a welding method, or pressing the bus bar 20 by using a separate member so as to contact to the external terminal of the battery modules 10a and 10b.

The bus bar 20 may be formed in a shape of a flat rod and is fastened to two battery modules 10a and 10b, both ends thereof being disposed to be adjacent to each other, respectively, to electrically connect the battery modules 10a and 10b.

The bus bar 20 may include terminal portions 22 fastened to the battery modules 10a and 10b and a fusing portion 25 to be broken when an overcurrent flows.

The terminal portions 22 are disposed at both ends of the bus bar 20. The fusing portion 25 may be disposed between two terminal portions 22 to connect the two terminal portions 22.

The fusing portion 25 may be broken when an overcurrent included in a fusing range flows to the bus bar 20, to disconnect an electrical connection between the terminal portions 22.

The fusing range may be specified in consideration of maximum voltage and maximum current conditions to which the bus bar 20 should withstand, a level of the overcurrent to be cutoff through the fusing portion 25, electrical properties (resistance and electrical conductivity) and/or mechanical properties (tensile strength), required for the bus bar 20, and the like.

The fusing portion 25 may include at least two bridges 26 having a narrower width than the terminal portions 22. To this end, the fusing portion 25 may be provided with at least one penetrating portion 28. The penetrating portion 28 may be formed in a form of a through hole penetrating through an inside of the bus bar 20, and may be used as a space for separating the bridges 26 from each other. The number of the penetrating portion 28 may be one less than the number of the bridges 26, but is not limited thereto.

The fusing portion 25 of the present embodiment may include four bridges 26, the four respective bridges 26 may have different resistance values.

More specifically, the fusing portion 25 of the present embodiment may be configured such that a first bridge 26a has the smallest resistance value and a second bridge 26b has a larger resistance value that that of the first bridge 26a. A third bridge 26c may have a larger resistance value than that of the second bridge 26b and a fourth bridge 26d may have the largest resistance value. As described above, the resistance value of the fusing portion 25 may be configured such that the first bridge 26a is the smallest and the resistance value gradually increases toward the fourth bridge 26d.

Therefore, the resistance values of the remaining bridges 26b to 26d except for the first bridge 26a may be set to be gradually larger than the resistance value of the first bridge 26a.

Since the resistance value is defined by a width W, a length L, a thickness T and the like, when the resistivity of the bus bar 20 is the same, the resistance values of the respective bridges may be formed differently by the difference in the width W, the length L, and the thickness T of the respective bridges 26.

In the present embodiment, the lengths L of the respective bridges 26 may be formed differently to differently configure the resistance values, but is not limited thereto.

The bus bar 20 according to the present embodiment may be configured such that the bridges 26 are sequentially fused. For example, when an overcurrent flows in the bus bar 20, the current is concentrated in the first bridge 26a, having the lowest resistance value, such that the first bridge 26a is initially fused.

When the first bridge 26a is fused, the current is redistributed to remaining second to fourth bridges 26b to 26d. In this process, the current is concentrated in the second bridge 26b having the lowest resistance value. Thus, the second bridge 26b is then fused to the first bridge 26a.

For the same reason, the third bridge 26c and the fourth bridge 26d are sequentially fused, such that the entire fusing portion 25 is completely fused. As described above, in the bus bar 20 of the present embodiment, the plurality of bridges 26 are consecutively/sequentially fused.

In this case, since the current according to a resistance ratio is differentially applied to the second to fourth bridges 26b to 26d until the first bridge 26a is fused, the third and fourth bridges 26b to 26d are fused at a high speed after the first bridge 26a is fused.

Accordingly, the bus bar 20 of the present disclosure is configured such that all the bridges 26 to the fourth bridge 26d are fused within 30 milliseconds (ms) after the first fusing is generated in the first bridge 26a, thereby cutting off the overcurrent.

For example, if the first bridge 26a is fused after 230 ms after an overcurrent occurs, the fourth bridge 26d is configured to be fused within a maximum of 260 ms.

To this end, the bus bar 20 of the present disclosure may be configured such that the reference value of the second bridge 26b is about twice the resistance value of the first bridge 26a, based on the resistance value of the first bridge 26a, the third bridge 26c is about three times the resistance value of the first bridge 26a, and the fourth bridge 26d is about 3.5 times the resistance value of the first bridge 26a. That is, when the resistance value of the first bridge 26a is 1, it may be configured that the resistance value of the second bridge 26b is 2, the resistance value of the third bridge 26c is 3, and the resistance value of the fourth bridge 26d is 3.5.

As described above, the differences in the resistance values are derived through various simulations for sequentially fusing the first bridge 26a to the fourth bridge 26d within 30 ms, after the first bridge 26a is fused.

In the bus bar 20 according to an embodiment thus configured, the plurality of bridges 26 may have different resistance values from each other.

When only one bridge is included, as in the case in the related art, the width of the bridge is configured to be very narrow compared to the width of the terminal portion 22. Therefore, since the current is concentrated in one bridge under normal operating environments, heat generation in the bridge is intensified, thereby reducing safety and life of the battery module.

However, when a plurality of bridges 26 are included, as in the present embodiment, since the cross-sectional area of the fusing portion 25 may be significantly increased, heat generation of the fusing portion 25 according to current applications under normal use conditions may be significantly reduced.

In addition, in the present disclosure, the resistance of the first bridge 26a, to be a starting point of the fusing, is selected to be the smallest, in order to eliminate uncertainty of an overcurrent cut-off. To stably induce the overcurrent cut-off, the resistance value of the remaining bridges 26 is adjusted based on the resistance value of the first bridge 26a, which is initially fused, such that the overcurrent cut-off is performed within a short time.

Accordingly, since the bridges 26 of the fusing portion 25 are sequentially fused, without being fused at the same time, the bridges 26 may promptly respond to a short-circuit situation.

In addition, since the fusing portion 25 is provided in the bus bar 20, it is not necessary to provide an additional device in the battery pack 1 in preparation for a short-circuit situation.

The bus bar 20 described above may be applied to all the bus bars for connecting the battery modules 10a and 10b, or battery cells, or for connecting the battery cells and a case.

Meanwhile, the bus bar according to the present disclosure is not limited to the above-described embodiment, and various modifications are possible.

Figure 4:
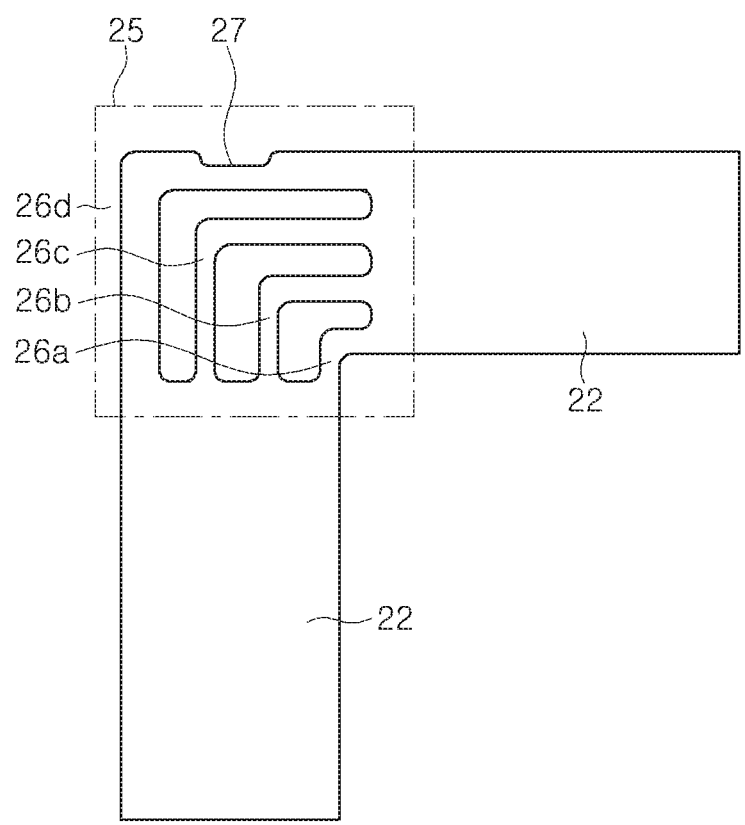
FIG. 4 is a schematic plan view illustrating a bus bar according to another embodiment of the present disclosure.

FIG. 4 is a schematic plan view illustrating a bus bar according to another embodiment of the present disclosure.

A bus bar 20a shown in FIG. 4 is a bus bar 20a disposed inside a battery module 10, and is a bus bar for connecting a the battery cell and an external terminal of the battery module 10.

In the present embodiment, the terminal portion 22 of the bus bar is bonded to an electrode of the battery cell and the external terminal of the battery module 10 through laser welding, respectively. Therefore, a hole in which the fixing member such as a bolt is coupled may be omitted.

A bus bar 20a according to the present embodiment is formed at a predetermined angle, for example, in a bent shape at a right angle. The fusing portion 25 is disposed in a bent edge portion.

In the present embodiment, the fusing portion 25 includes four bridges 26a, 26b, 26c, and 26d. However, the present disclosure is not limited thereto, and may be configured in various numbers as needed.

As the fusing portion 25 is formed in an edge, a first bridge 26a is formed inside an edge having a short distance and a fourth bridge 26d is disposed outside of an edge having the longest distance.

In addition, the fusing portion 25 is provided with a narrow section 27 having a narrower width of the bridges 26a, 26b, 26c, and 26d. In the present embodiment, a portion of the fourth bridge 26d is formed as the narrow section 27.

When the bridge 26 is provided with the narrow section 27, fusing occurs in the narrow section 27. Therefore, a fusing point may be specified in a bridge 26 having a long length as the fourth bridge 26d.

Figure 5:
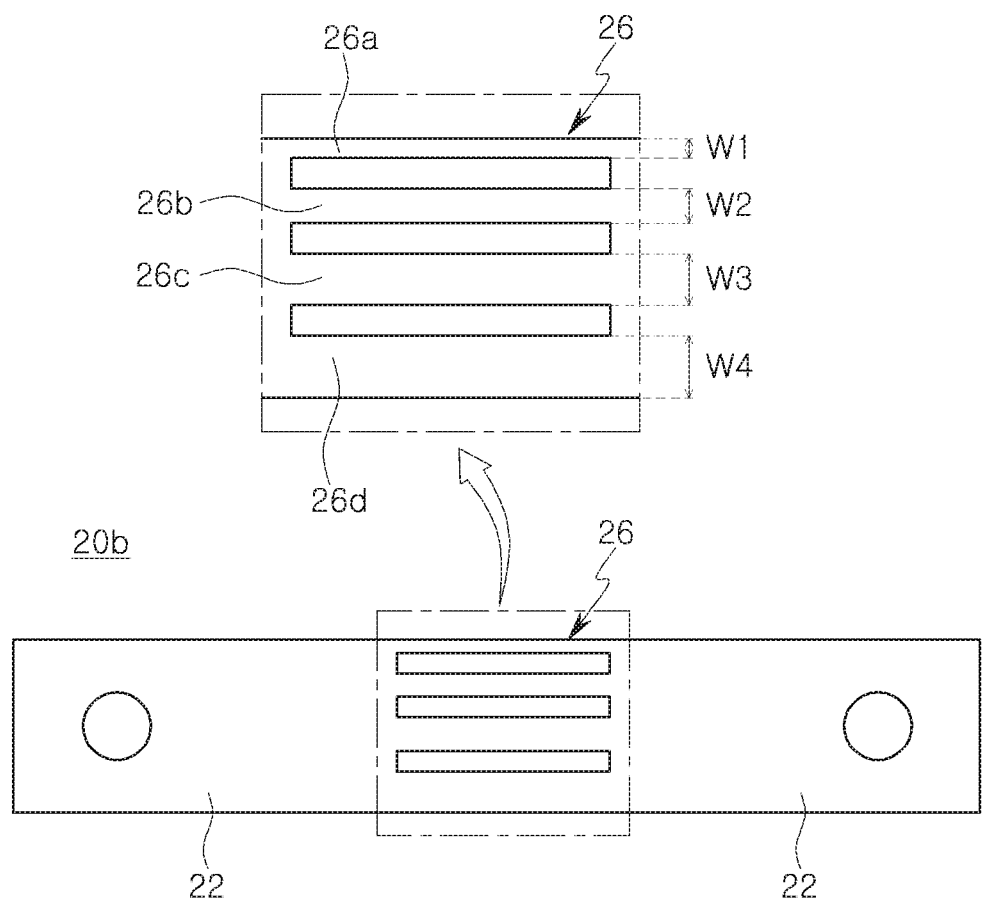
FIG. 5 is a schematic plan view illustrating a bus bar according to another embodiment of the present disclosure.

FIG. 5 is a schematic plan view illustrating a bus bar according to another embodiment of the present disclosure.

Referring to FIG. 5, the bus bar 20b according to the present embodiment are configured such that the bridges 26a, 26b, 26c, and 26d have the same length and different widths W1, W2, W3, and W4. Therefore, the resistance values of the respective bridges 26a, 26b, 26c, and 26d are configured to be differently through the sizes of the widths. However, the present disclosure is not limited thereto, various modifications are possible, for example, the resistance values are differently formed by varying the thicknesses and lengths of the respective bridges 26a, 26b, 26c, and 26d, as necessary.

Figure 6:
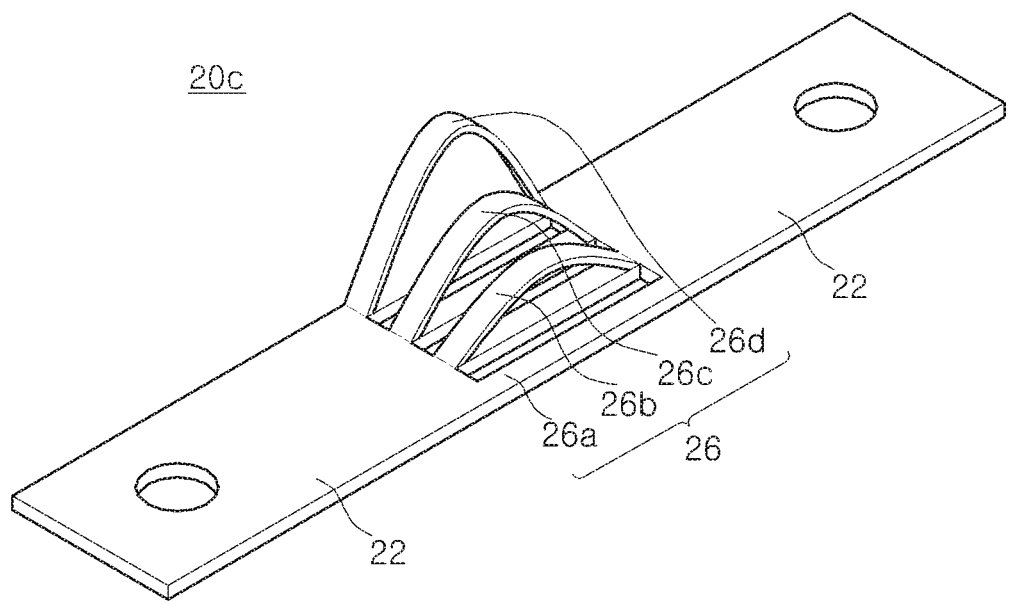
FIG. 6 is a schematic perspective view illustrating a bus bar according to another embodiment of the present disclosure.

FIG. 6 is a schematic perspective view illustrating a bus bar according to another embodiment of the present disclosure.

Referring to FIG. 6, the bus bar 20c according to the present disclosure is configured such that the bridges 26 have different lengths from each other. The remaining bridges 26, except for the first bridge 26a having the shortest length may be disposed to be protruded to one side of the bus bar 20.

As the bridges 26 having long lengths are protruded, the bus bar 20 of the present embodiment may significantly reduce the length of the fusing portion 25. Therefore, the bus bar 20 of the present embodiment may be easily used for a structure in which the distance between the terminal portions 22 is narrow.

Figure 7:
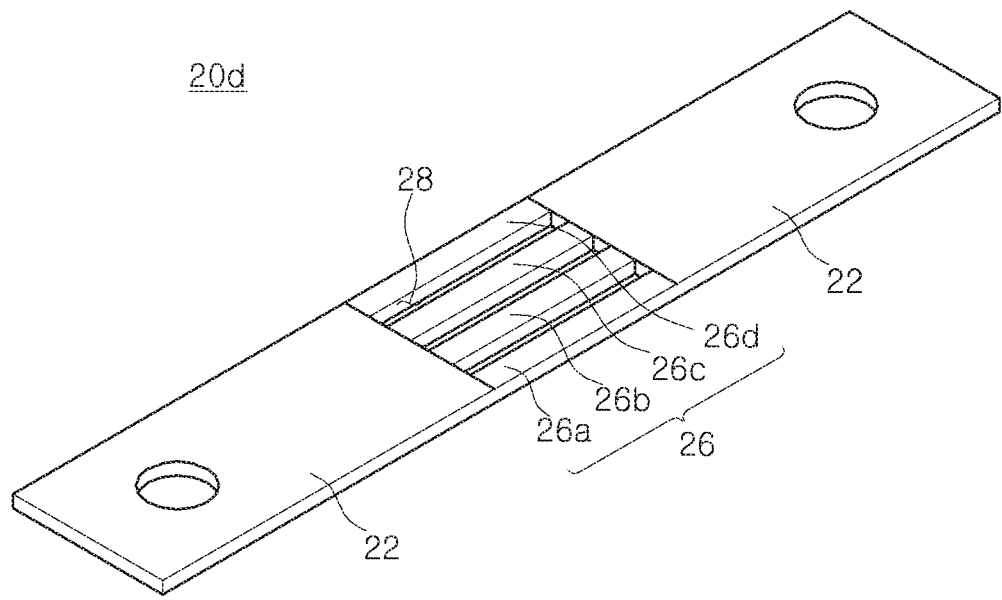
FIG. 7 is a schematic perspective view illustrating a bus bar according to another embodiment of the present disclosure.

FIG. 7 is a schematic perspective view illustrating a bus bar 20 according to another embodiment of the present disclosure.

Referring to FIG. 7, a bus bar 20d according to the present disclosure is configured such that the bridges 26 have the same width and the same length as each other. The respective bridges 26 may be formed of different materials from each other such that the resistance values thereof may be differently configured by the difference in resistivity of the material.

As another configuration, the bridges 26 may be formed of a material having a melting point, lower than that of the terminal portion 22, and may be composed of a single metal or an alloy component. For example, all the bridges 26 are composed of alloy components, and the resistance values of the respective bridges 26a, 26b, 26c, and 26d may be configured differently by differentiating the component combinations for the respective bridges 26a, 26b, 26c, and 26d.

Therefore, even in the case that the bridges 26 of the present embodiment are formed to have the same length, the same width, and the same thickness, the resistance values between the bridges 26 may be different from each other.

Thus, when an overcurrent flows to the bus bar 20, the first bridge 26a, having the lowest resistance value, is set as a starting point and sequentially fused to the fourth bridge 26d.

FIG. 7 shows a case in which the bridges 26 are disposed on the same plane as the terminal portion 22 as an example, but is not limited thereto. Various modifications such as the bridges 26 are stacked and disposed on one surface of the terminal portion 22 or may be fitted and coupled to the terminal portion 22, is possible.

As set forth above, according to an embodiment of the present disclosure, since a plurality of bridges are included, a cross-sectional area of the fusing portion may be significantly increased. Therefore, it is possible to significantly reduce heat generation of the fusing portion according to application of a current under normal use environments.

In addition, since the bridges of the fusing portion are sequentially fused without being fused simultaneously, the bridges may respond promptly to short-circuit situations.

While example embodiments have been shown and described above, it will be apparent to those skilled in the art that modifications and variations could be made without departing from the scope of the present inventive concept as defined by the appended claims.

What is claimed is:

1. A bus bar, comprising:
   terminal portions disposed at both ends thereof, respectively; and
   a plurality of bridges disposed between the terminal portions to electrically connect the terminal portions, and to be sequentially fused when an overcurrent flows,
   wherein the plurality of bridges are formed to have different cross-sectional areas, and different resistance values, respectively, and
   wherein the plurality of bridges are connected to each other in parallel.

2. The bus bar of claim 1, wherein the plurality of bridges are formed such that any one of a width, a length, and a thickness thereof is different.

3. The bus bar of claim 1, wherein the plurality of bridges are formed of different materials from each other.

4. The bus bar of claim 1, wherein a penetrating portion having a through-hole shape is disposed between the bridges.

5. The bus bar of claim 1, wherein at least one of the bridges comprises a narrow section having a narrower width.

6. The bus bar of claim 1, wherein at least one of the bridges is configured such that at least a portion thereof are disposed to be protruded to one side.

7. The bus bar of claim 1, wherein the plurality of bridges are sequentially fused from the bridge having the lowest resistance value when an overcurrent flows in the bus bar.

8. The bus bar of claim 1, wherein the bridges are composed of four bridges,
   wherein when a resistance value of the first bridge is 1, it is configured such that a resistance value of the second bridge is 2, a resistance value of the third bridge is 3, a resistance value of the fourth bridge is 3.5.

9. The bus bar of claim 1, wherein the resistance value of the first bridge, among the plurality of bridges, is lower than the resistance values of the remaining bridges,
   wherein the resistance values of the remaining bridges are set to be gradually higher than the resistance value of the first bridge.

10. A battery pack, comprising:
    at least one bus bar as described in claim 1; and
    a plurality of battery modules electrically connected through the bus bar.

* * * * *